United States Patent
Moriyama

(10) Patent No.: US 8,915,164 B2
(45) Date of Patent: Dec. 23, 2014

(54) TILT-TYPE STEERING APPARATUS

(71) Applicant: NSK Ltd., Tokyo (JP)

(72) Inventor: Seiichi Moriyama, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/345,447

(22) PCT Filed: Sep. 30, 2013

(86) PCT No.: PCT/JP2013/076575
§ 371 (c)(1),
(2), (4) Date: Mar. 18, 2014

(87) PCT Pub. No.: WO2014/069140
PCT Pub. Date: May 8, 2014

(65) Prior Publication Data
US 2014/0338491 A1     Nov. 20, 2014

(30) Foreign Application Priority Data

Nov. 2, 2012   (JP) .................................. 2012-242385

(51) Int. Cl.
*B62D 1/18*          (2006.01)
*B62D 1/187*         (2006.01)
(52) U.S. Cl.
CPC .................................... *B62D 1/187* (2013.01)
USPC ........................................... 74/493; 280/775
(58) Field of Classification Search
CPC .......... B62D 1/18; B62D 1/184; B62D 1/185; B62D 1/187
USPC ..................... 280/775, 777, 779; 74/492, 493
See application file for complete search history.

(56) References Cited

U.S. PATENT DOCUMENTS

| 7,240,922 B2 * | 7/2007 | Nakano et al. ................. 280/777 |
| 8,720,299 B2 * | 5/2014 | Nakamura et al. .............. 74/493 |
| 2004/0134302 A1 * | 7/2004 | Ko et al. .......................... 74/493 |
| 2004/0261564 A1 * | 12/2004 | Sato ................................ 74/492 |
| 2008/0141817 A1 * | 6/2008 | Fuchigami et al. ............. 74/493 |
| 2008/0202276 A1 * | 8/2008 | Harris et al. .................... 74/493 |

(Continued)

FOREIGN PATENT DOCUMENTS

| JP | 62161079 U | 10/1987 |
| JP | 06-081880 A | 3/1994 |

(Continued)

OTHER PUBLICATIONS

ISR (PCT/ISA/210) issued Dec. 17, 2013 for International Application PCT/JP2013/076575.

(Continued)

*Primary Examiner* — Paul N Dickson
*Assistant Examiner* — Robert A Coker
(74) *Attorney, Agent, or Firm* — Sughrue Mion, PLLC

(57) ABSTRACT

A tilt-type steering apparatus includes a tilt lever, an expandable mechanism having a driving cam rotated by the tilt lever and a driven cam engaged with the driving cam, and a telescopic damper arranged to apply resistance against the rotation of the tilt lever in a direction allowing a position of a steering wheel to be adjusted. The telescopic damper is provided between a lever-side engaging portion which rotates together with the tilt lever and a cam-side engaging part of the driven cam.

8 Claims, 20 Drawing Sheets

(56) References Cited

U.S. PATENT DOCUMENTS

| | | | |
|---|---|---|---|
| 2009/0020995 A1* | 1/2009 | Kim | 280/775 |
| 2010/0139439 A1* | 6/2010 | Uesaka | 74/493 |
| 2012/0312117 A1* | 12/2012 | Maniwa | 74/493 |

FOREIGN PATENT DOCUMENTS

| | | | |
|---|---|---|---|
| JP | 08-35539 A | 2/1996 | |
| JP | 2002059851 A | 2/2002 | |
| JP | 2006-051876 A | 2/2006 | |
| JP | 2009-030677 A | 2/2009 | |
| JP | 2009168159 A | 7/2009 | |
| JP | 2009196582 A | 9/2009 | |
| JP | 2011121443 A | 6/2011 | |

OTHER PUBLICATIONS

Written Opinion issued Dec. 17, 2013, in International Application No. PCT/JP2013/076575.

* cited by examiner though it into the input shaft 3 via a separate universal joint 9. The shown example is configured as an electrically-operated power steering apparatus. A front end portion of the steering column 6 is provided with an electric motor 10 that is a driving source for applying an auxiliary force and a housing 11 that is fixed to the front end portion of the steering column 6. The electric motor 10 is supported by the housing 11. Output torque (auxiliary force) of the electric motor 10 is applied to the steering shaft 5 through a gear unit and the like provided in the housing 11.

TILT-TYPE STEERING APPARATUS

TECHNICAL FIELD

The invention relates to a tilt-type steering apparatus configured to adjust a height position of a steering wheel in conformity to a physique of a driver or a driving posture.

BACKGROUND ART

A tilt-type steering apparatus is widely known. First, a first conventional example of a vehicle steering apparatus will be described based on the disclosure of Patent Document 1. As shown in FIG. 7, a vehicle steering apparatus is configured such that rotation of a steering wheel 1 is transmitted to an input shaft 3 of a steering gear unit 2, a pair of left and right tie-rods 4, 4 is pushed/pulled in connection with rotation of the input shaft 3 and a steering angle is thus applied to front wheels. The steering wheel 1 is supported and fixed to a rear end portion of a steering shaft 5. The steering shaft 5 is rotatably supported by a cylindrical steering column 6 with being axially inserted into the steering column 6. A front end portion of the steering shaft 5 is coupled to a rear end portion of an intermediate shaft 8 via a universal joint 7. A front end portion of the intermediate shaft 8 is coupled to the input shaft 3 via a separate universal joint 9. The shown example is configured as an electrically-operated power steering apparatus. A front end portion of the steering column 6 is provided with an electric motor 10 that is a driving source for applying an auxiliary force and a housing 11 that is fixed to the front end portion of the steering column 6. The electric motor 10 is supported by the housing 11. Output torque (auxiliary force) of the electric motor 10 is applied to the steering shaft 5 through a gear unit and the like provided in the housing 11.

An upper-front end portion of the housing 111 is supported in a tiltable manner with respect to a vehicle body 12 by a tilt shaft 13 arranged in a width direction. A support bracket 14 supported by the vehicle body 12 is mounted to a rear end-slanted part of the intermediate portion of the steering column 6. The support bracket 14 has a pair of support plate portions 15 spaced in the width direction. The support bracket 14 is supported by the vehicle body 12 in a state in which the support plate portions 15 hold the intermediate portion of the steering column 6 from both sides thereof in the width direction. A lower part of the intermediate portion of the steering column 6 clamped by the support plate portions 15 is provided with a displacement bracket 16 (an example of a clamped portion). In the specification, the "width direction" means a width direction of the vehicle body on which the steering apparatus is mounted, and a "front-rear direction" means a front-rear direction of the vehicle body. The "intermediate portion" is a part other than both ends and may include a part near one end or both ends.

Each support plate portion 15 is formed with an up-down slot 17 having an arc shape about the tilt shaft 13 or a linear shape along a tangential line direction of the arc shape and is elongated in an up-down direction. A portion of the displacement bracket 16 aligned with a portion of the slot 17, is formed with a through-hole 18. The structure shown in FIG. 7 is provided with a tilt-telescopic mechanism configured to adjust not only a height position of the steering wheel 1 but also a front-rear position of the steering wheel 1. The through-hole 18 is formed as a front-rear slot elongated in an axial direction of the steering shaft 5 and the steering column 6. In conformity to this, the steering shaft 5 and the steering column 6 are configured in a telescopic manner. A tilt rod is inserted in the slot 17 and the through-hole 18 in the width direction. One end portion of the tilt rod is provided with a tilt lever and the other end portion is provided with an anchor part, thereby forming a tilt lock mechanism for widening and narrowing a gap between the inner surfaces of the support plate portions 15 based on a rotation of the tilt lever. When positioning the steering wheel 1, the tilt lever is rotated in a predetermined direction, so that the gap between the inner surfaces of the support plate portions 15 is widened. In this state, the height and front-rear positions of the steering wheel 1 can be adjusted within a range in which the tilt rod can be moved in the slot 17 and the through-hole 18. After moving the steering wheel 1 to a desired position, when the tilt lever is rotated in a reverse direction to thus narrow the gap between the inner surfaces of the support plate portions 15, the steering wheel 1 can be kept at an adjusted position.

As a more specific structure of the tilt-type steering apparatus, Patent Document 1 also discloses a structure shown in FIGS. 8 to 11. This second conventional example also has a telescopic mechanism configured to adjust the front-rear position of the steering wheel 1, in addition to the tilt mechanism configured to adjust the height position of the steering wheel 1 (see FIG. 7). A steering column 6a of the second conventional example has a rear-side outer column 19 and a front-side inner column 20. A front end portion of the outer column 19 and a rear end of the inner column 20 are fitted in an axially movable manner, so that an entire length of the steering column 6a can be extended or shortened. The front end portion of the outer column 19 has a notched cylindrical shape, so that a diameter of the front end portion of the outer column 19 can be expanded and reduced. By adjusting a force holding the front end portion of the outer column 19 from both sides thereof in the width direction, an inner diameter of the front end portion of the outer column 19 can be expanded or reduced. A steering shaft 5a is supported radially inside the steering column 6a in a rotatable manner. The steering shaft 5a is also configured such that an entire length of the steering shaft 5a can be extended or shortened by a combination of an outer shaft 21 and an inner shaft 22.

A housing 11a for mounting components of the electrically-operated power steering apparatus, such as an electric motor 10a (see FIG. 11), a decelerator and the like, is connected and fixed to a front end portion of the steering column 6a. The housing 11a is supported in a tiltable manner at a portion of the vehicle body by a tilt shaft (bolt) inserted into a support pipe 23 provided widthwise at an upper part of the housing 11a. The steering wheel 1 is fixed to a rear end portion of the steering shaft 5a more protruding rearwards than the steering column 6a. A front end portion of the steering shaft 5a more protruding forwards than the steering column 6a is coupled to an intermediate shaft 8 (see FIG. 7) via the universal joint 7.

A support bracket 14a is connected to and supported by a vehicle body-side bracket (not shown) fixed to the vehicle body such that it can be displaced (separated) forward by a impact load based on a secondary collision. The support bracket 14a has an attachment plate part 24 and a pair of left and right support plate portions 15a. 15b, which are made of metal plate materials having sufficient strength and stiffness, such as steel plates. The attachment plate part 24 and the support plate portions 15a, 15b are connected and fixed by welding and the like. The attachment plate part 24 is supported by the vehicle body so that it can be separated forward based on the impact load applied due to the secondary collision.

The support plate portions 15a, 15b are provided to clamp the outer column 19 from both sides thereof. At locations on the support plate portions 15a, 15b that are aligned with each other, arc-shaped up-down slots 17 (partially shown in FIG. 8) having a central axis of the support pipe 23 as a center are formed. The outer column 19 is supported between the support plate portions 15a, 15b by a tilt rod 25 inserted into the up-down slots 17. A front-upper part of the outer column 19 is provided with a clamped portion 27 having a pair of supported wall portions 26, 26, which are widthwise spaced from each other. The respective supported wall portions 26, 26 are formed with front-rear slots 28 (through-holes, see FIG. 9) which are elongated in the axial direction of the outer column 19. The outer column 19 is supported with respect to the support bracket 14a by the tilt rod 25 inserted into the up-down slots 17 and the front-rear slots 28. Therefore, the outer column 19 can be tilted in the up-down direction about the bolt inserted into the support pipe 23 within a range in which the tilt rod 25 can move inside the up-down slots 17. Furthermore, the outer column 19 is movable in the front-rear direction (axial direction) within a range in which the tilt rod 25 can move inside the front-rear slots 28.

The tilt rod 25 has one end portion (a right end portion of FIG. 11) to which an outward flange-shaped collar part 29 (an anchor part) is fixed and the other end portion to which a can device 32 having a driving cam 30 a driven cam 31 is provided. When the driving cam 30 is rotated by a tilt lever 33, a distance between the driven cam 31 and the collar part 29 can be widened or shortened. Opposing surfaces of the driving cam 30 and the driven cam 31 are respectively formed with cam surfaces on which concave portions and convex portions are alternately arranged via inclined surfaces (see, e.g., Patent Document 2). The cam device 32 is configured such that an axial size of the cam device 32 is expanded with the convex portions being butted to each other and the axial size of the camn device 32 is reduced with the convex portions being fitted to the concave portions of the counterpart side surface. The driving cam 30 is connected to a base end part of the tilt lever 33 in a fixed manner. The driven cam 31 is engaged with the up-down slot 17 formed at one (the left support plate portion 15a) of the support plate portions 15a, 15b such that it is movable only along the up-down slot 17 (with the rotation about the tilt rod 25 being blocked).

When positioning the steering wheel 1, the tilt lever 33 is rotated downward to reduce the axial size of the cam device 32 and to expand the distance between the driven cam 31 and the collar part 29. As a result, the distance between the inner surfaces of the support plate portions 15a, 15b is increased and a surface pressure between the inner surfaces of the support plate portions 15a, 15b and the outer surfaces of the supported wall portions 26, 26 is lowered or lost. In this state, since the supporting force of the clamped portion 27 with respect to the support bracket 14a is lowered or lost, the outer column 19 is moved within the range in which the tilt rod 25 is movable inside the up-down slots 17 and the front-rear slots 28. By this movement, the position (one or both of the height position and the front-rear position) of the steering wheel 1, which is supported by and fixed to the rear end portion of the steering shaft 5a rotatably supported in the outer column 19, is adjusted.

After positioning the steering wheel 1, the tilt lever 33 is rotated upward to expand the axis size of the cam device 32 and to shorten the distance between the driven cam 31 and the collar part 29. As a result, the inner surfaces of the support plate portions 15a, 15b and the outer surfaces of the supported wall portions 26, 26 are strongly contacted to each other, so that the height position of the steering wheel 1 is fixed. At the same time, the diameter of the front end portion of the outer column 19, to which the supported wall portions 26, 26 are provided, is reduced and an inner periphery of the front end portion of the outer column 19 and an outer periphery of the rear end portion of the inner column 20 are strongly contacted to each other, so that the steering column 6a cannot be extended or shortened. As a result, the front-rear position of the steering wheel 1 is fixed.

In the tilt-type steering apparatus having the cam device 32 as the engaging mechanism, as described above, a rotation amount of the tilt lever 33 is suppressed to be smaller, compared to a tilt-type steering apparatus having a screw-type mechanism having a nut and a bolt (stud) as the engaging mechanism, so that the high engaging force is obtained. However, as the cam device 32 is used, when the tilt lever 33 is rotated in a predetermined direction (for example, a downward direction) so as to position the steering wheel 1, the tilt lever 33 may be excessively rapidly rotated. The reason is that when the tilt lever 33 is rotated in the predetermined direction to thus move the respective convex portions towards the concave portions of the counterpart side surface from the state where the convex portions of the cam surfaces of the cams 30, 31 are butted to each other, the respective convex portions are moved to slide down along the inclined surfaces of the counterpart side cam surface. That is, in a state in which the position of the steering wheel 1 is fixed, a force is applied between the cams 30, 31 in a direction of separating the cams from each other. From this state, when moving the respective convex portions of the cam surfaces of the cams 30, 31 towards the concave portions of the counterpart side cam surface, the respective convex portions are rapidly moved towards the respective concave portions along the inclined surface of the other side cam surface. In other words, the respective convex portions are moved to slide down along the respective inclined surfaces towards the respective concave portions. As a result, the tilt lever 33 having the base end part to which the driving cam 30 is fixed is rapidly rotated in the predetermined direction, so that a driver operating the tilt lever 33 may feel uncomfortable or unpleasant, or an unpleasant collision noise may be generated.

PRIOR ART DOCUMENTS

Patent Documents

Patent Document 1: JP 2011-121443 A
Patent Document 2: JP 2002-59851 A

SUMMARY OF INVENTION

Problem to be Solved by Invention

One or more embodiments of the present invention provide a tilt-type steering apparatus configured such that a driver operating a tilt lever does not feel unpleasant by preventing the tilt lever from being rapidly rotated when rotating the tilt lever to position a steering wheel.

One or more embodiments of the present invention provide a tilt-type steering apparatus configured to suppress a posture change of a telescopic damper, resulting from a height position of a steering wheel or an operation position of a tilt lever, to be small so that the telescopic damper does not become a resistance against a height position adjustment when adjusting the height position of the steering wheel.

Means for Solving the Problem

According to one aspect of the invention, a tilt-type steering apparatus includes a steering column, a clamped portion having a through-hole, a steering shaft, a support bracket having a pair of tilt slots, a tilt rod, an anchor part, a pressing part, an expandable mechanism, a tilt lever and a telescopic damper. The steering column is cylindrical. The clamped portion is provided at a portion of the steering column in a fixed manner. The through-hole penetrates through the clamped portion in a width direction. The steering shaft is supported radially inside the steering column in a rotatable manner, and has a rear end portion configured to protrude rearwards from a rear end opening of the steering column such that a steering wheel is fixed thereto. The support bracket has a pair of support plate portions clamping the clamped portion from both sides in the width direction and is configured to be supported by a fixing part of a vehicle body. Tilt slots are formed at locations on the support plate portions that are aligned with each other, and are elongated in an up-down direction. The tilt rod is inserted into the tilt slots and the through-hole in the width direction. The anchor part is provided at one end portion of the tilt rod protruding from an outer side surface of one of the support plate portions. The pressing part is provided at the other end portion of the tilt rod protruding from an outer side surface of the other support plate portion. The expandable mechanism is configured to widen or to narrow a gap between the pressing part and the anchor part. The tilt lever is operable to widen or to narrow the gap by rotating about the tilt rod. The telescopic damper serves as a resistance in a direction in which the entire length of the telescopic damper is extended or shortened, and is arranged to apply the resistance against a rotation of the tilt lever in a direction allowing a position of the steering wheel to be adjusted.

The expandable mechanism includes a cam device having a driven cam and a driving cam. An outer side surface of the driven cam has a driven cam surface formed by connecting a convex portion and a concave portion via an inclined surface, and the driven cam is engaged with the tilt slot of the other support plate portion so as to be movable only along the tilt slot, in a state in which the tilt rod is rotatably inserted into a center hole of the driven cam. An inner side surface of the driving cam has a driving cam surface facing the driven cam surface and formed by connecting a convex portion and a concave portion via an inclined surface, and the driving cam is configured to be rotated by the tilt lever around a center axis of the tilt rod. The expandable mechanism is configured such that an axial size of the cam device is expanded or reduced in accordance with an engagement of the driven cam surface and the driving cam surface.

The telescopic damper is arranged to extend between and connect a lever-side engaging portion which rotates together with the tilt lever around the center axis of the tilt rod and a cam-side engaging part provided on the driven cam, and a distance between the lever-side engaging portion and the cam-side engaging part changes in accordance with the rotation of the tilt lever.

The telescopic damper may include a hollow cylinder part having an distal end portion with an opening, a damper rod having a distal end portion loosely inserted into the cylinder part from the distal end of the cylinder part, and a grease interposed between an inner periphery of the cylinder part and an outer periphery of the damper rod, and the telescopic damper may be disposed with the cylinder part being arranged at a lower side.

Each of the inner periphery of the cylinder part and the outer periphery of the damper rod is configured as an corrugated surface having a series of grooves and projections arranged alternately in a circumferential direction, thereby ensuring sufficient area in which these peripheral surfaces face each other.

A kinematic viscosity of a base oil of the grease may be 500 to 50000 mm$^2$/s at 40° C.

A linear expansion coefficient of a radially inner side material configuring the damper rod may be greater than a linear expansion coefficient of a radially outer side material configuring the cylinder part. For example, the radially outer side material may be an iron-based alloy and the radially inner side material may be a lightweight alloy or a synthetic resin. Alternatively, the radially outer side material may be a metal and the radially inner side material may be a synthetic resin.

The tilt-type steering apparatus may include a telescopic mechanism configured to adjust a front-rear position of the steering wheel. For example, the steering column is configured as a telescopic steering column comprising an outer column and an inner column, the outer column and the inner column being telescopically combined. The is configured as a telescopic steering shaft comprising an outer shaft and an inner shaft, the outer shaft and the inner shaft being telescopically combined in a torque transmittable manner. The is provided on the outer column and the through-hole is formed as a front-rear slot elongated in an axial direction of the outer column. The is arranged such that, in addition to a height position of the steering wheel, a front-rear position of the steering wheel is adjustable within a range in which the tilt rod is movable inside the front-rear slot.

Advantage of Invention

According to the above-described tilt-type steering apparatus, it is possible to prevent the tilt lever from being rapidly rotated when rotating the tilt lever so as to position the steering wheel. That is, the telescopic damper provided between the lever-side engaging portion which rotates together with the tilt lever and the cam-side engaging part provided on the driven cam serves as a resistance against the rotation of the tilt lever in the direction of enabling the position of the steering wheel to be adjusted. Therefore, even with the distal ends of the respective convex portions of the driving cam surface and the driven cam surface of the expandable mechanism being pressed against the counterpart cam surface, the momentum of reducing the axial size of the expandable mechanism is weakened. As a result, it is possible to prevent a driver operating the tilt lever that rotates the driving-side cam from feeling unpleasant. The telescopic damper can realize the sufficient damper and attenuation effects with a small size. Also, even when a mounting space is limited for layout reasons, the telescopic damper can be incorporated into the tilt-type steering apparatus to sufficiently prevent the unpleasant feeling.

The telescopic damper is arranged such that it is extended or shortened only when the tilt lever is rotated. That is, in a state in which the tilt lever is rotated to allow an adjustment of a height position of the steering wheel, even if the steering column is tilted so as to adjust the height position of the steering wheel, the distance between the lever-side engaging portion and the cam-side engaging part does not change. Therefore, since the telescopic damper is not extended or shortened as the steering column is tilted, the telescopic damper does not function as a resistance against the height position adjustment of the steering wheel, so that it is possible to perform the height position adjustment more smoothly.

When the hollow cylinder part having a distal end with an opening is arranged at the lower side, the grease interposed between the inner periphery of the cylinder part and the outer periphery of the damper rod is difficult to leak out. Therefore, it is possible to keep sufficient amount of grease between the peripheries for a long time, and to keep the effect of preventing the unpleasant for a long time.

By sufficiently providing an area in which the inner periphery of the cylinder part and the outer periphery of the damper rod face each other, it is possible to obtain sufficient damper effect with a smaller telescopic damper.

When the kinematic viscosity of the base oil of the grease is controlled to be within a range of 500 to 50000 mm$^2$/s (40° C.), it is possible to effectively prevent the unpleasant feeling. In particular, when the kinematic viscosity of the base oil of the grease is controlled within a range of 5000 to 20000 mm$^2$/s (40° C.), it is possible to sufficiently prevent the unpleasant feeling even if the inner periphery of the cylinder part and the outer periphery of the damper rod are configured as simple cylindrical surfaces.

When the linear expansion coefficient of the radially inner side material forming the damper rod is greater than the linear expansion coefficient of the radially outer side material forming the cylinder part, it is possible to suppress a change in damper performance due to a temperature change to be small. That is, while suppressing the change in damper performance to be small, it is possible to suppress a variation of force required to operate the tilt lever to be small, irrespective of the temperature change. As a result, it is possible to further reduce discomfort feeling, which may be given to the driver operating the tilt lever.

EMBODIMENTS OF INVENTION

First, a related embodiment of the invention will be described with reference to FIGS. 12 to 20.

Figure 19A:
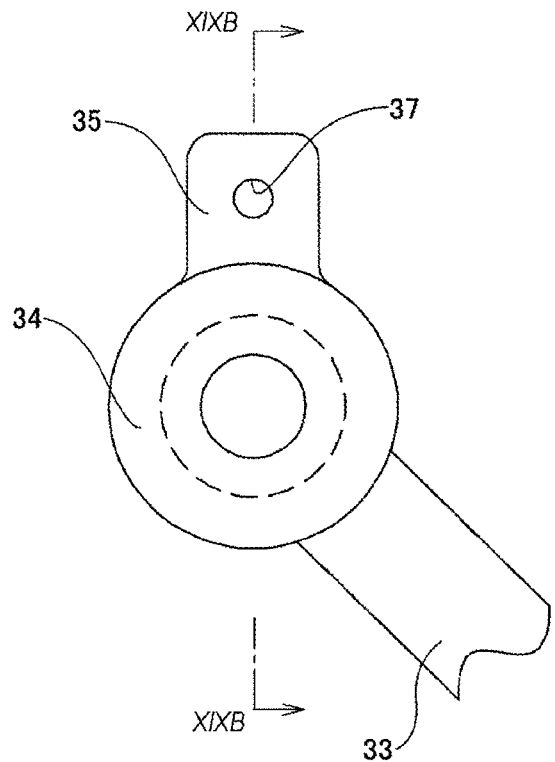
FIG. 19A is a side view of a base end part of a tilt lever, viewed in the same direction as FIG. 12.
Figure 19B:
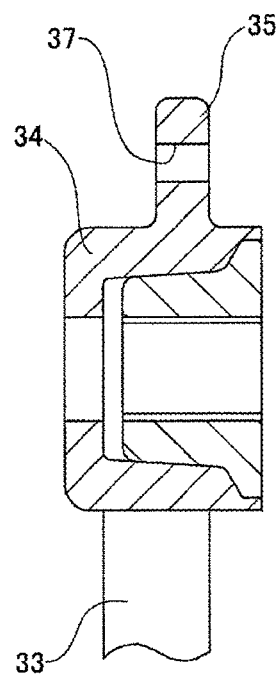
FIG. 19B is a sectional view taken along a line XIXB-XIXB of FIG. 19A.

In a tilt-type steering apparatus of the related embodiment, a base end part of a tilt lever 33 is provided with a boss part 34. An outer periphery of the boss part 34 is formed with a protrusion 35 (an example of the lever-side engaging portion), which protrudes from the outer periphery of the boss part 34 in a radially outer direction, at a part that is spaced from the tilt lever 33 in a circumferential direction. Hence, the protrusion 35 is rotated about a tilt rod 25 together with the tilt lever 33. A telescopic damper 36 is arranged to extend between and connect a distal end of the protrusion 35 and an outer surface of a support plate portion 15c of a support bracket 14b. As shown in FIGS. 19A and 19B, a distal end of the protrusion 35 is formed with a circular connection hole 37 to which one end portion of the telescopic damper 36 is connected. A lower half part of the support plate portion 15c is formed with an extension part 38 that extends rearwards. A rear end portion of the extension part 38 is formed with a circular connection hole to which the other end portion of the telescopic damper 36 is connected.

The telescopic damper 36 has a cylinder part 39, a damper rod 40 and a grease 41. The telescopic damper 36 can be extended or shortened, and serves as a resistance against a force applied in the direction in which it is extended or shortened. The cylinder part 39 is formed to have a hollow cylindrical shape having a distal end portion with an opening, which is made of metal such as aluminum or an oil resistance synthetic resin. The damper rod 40 is formed to have a cylinder shape by the same material as the cylinder part 39. The damper rod 40 is loosely inserted into the cylinder part 39 from a distal end portion to an intermediate portion thereof through the opening at the distal end of the cylinder part 39. The grease 41 is interposed between an inner periphery of the cylinder part 39 and an outer periphery of the damper rod 40. In other words, a gap 42 between the peripheries is substantially blocked by the grease 41. A kinematic viscosity of a base oil of the grease 41 is preferably within a range of 500 to 50000 mm$^2$/s (40° C.), more preferably within a range of 5000 to 20000 mm$^2$/s (40° C.). If the kinematic viscosity of the base oil of the grease 41 exceeds 50000 mm$^2$/s (40° C.), an operation at low temperatures is poor, and if it is smaller than 500 mm$^2$ is (40C), it is difficult to obtain a damper effect at high temperatures. A worked penetration of the grease 41 is preferably within a range of 100 to 400 (25° C.), more preferably 200 to 300. When the grease is hard, it cannot be filled well, and when the grease is soft, it leaks well.

Figure 16A:
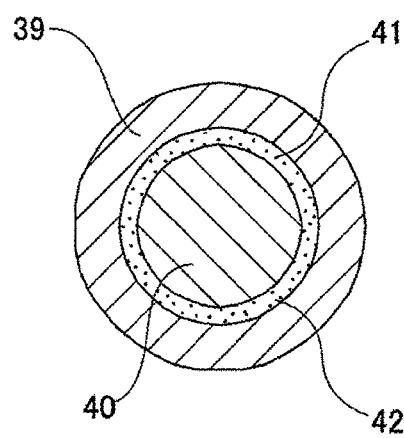
FIG. 16A is a sectional view taken along a line XVI-XVI of FIG. 15, illustrating an example of the telescopic damper structure.
Figure 16B:
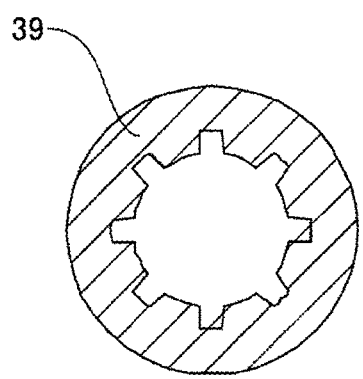
FIG. 16B is a sectional view taken along a line XVI-XVI of FIG. 15, illustrating another example of the telescopic damper structure with a rod being omitted.

Each profile of the inner periphery of the cylinder part 39 and the outer periphery of the damper rod 40 may be a simple cylindrical surface as shown in FIG. 16A or may be formed in a corrugated shape like splines as shown in FIG. 16B. When the cylinder part 39 and the damper rod 40 are relatively moved in an axial direction, the grease 41 existing in the gap 42 is applied with a shear force, so that the telescopic damper 36 generates a resistance against the relative movement (the expansion or the contraction of the telescopic damper 36). The resistance force is increased as the kinematic viscosity of the base oil of the grease 41 is higher, as a thickness of the gap 42 is smaller and as facing surfaces of the peripheries are wider (as the circumferential length of the gap 42 is longer). The resistance force is increased when a momentum of the telescopic damper 36 to expand or to contract is higher (when an expansion speed or a contraction speed is fast) and is decreased when the momentum of the telescopic damper to expand or to contract is lower (when the expansion speed or the contraction speed is slow).

Therefore, the resistance (damper performance) against to the force of the telescopic damper 36 in the expansion and contraction direction is made to be a desired value by appropriately controlling the kinematic viscosity of the base oil of the grease 41, the thickness of the gap 42 and the facing surfaces of the peripheries. When rotating the tilt lever 33 downward so as to position the steering wheel 1, it is possible to effectively prevent the tilt lever 33 from being rapidly rotated. To this end, respective end portions of the telescopic damper 36 are connected to and supported by the distal end of the protrusion 35 and the rear end portion of the extension part 38 so as to allow the rotation and the axial movement of the tilt rod 25.

Figure 17A:
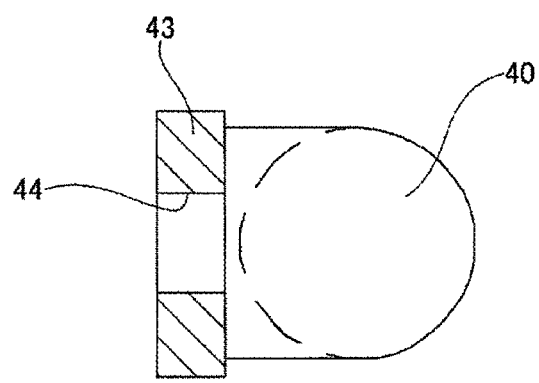
FIG. 17A is a sectional view taken along a line XVII-XVII of FIG. 15, illustrating an example of a distal end of a rod of the telescopic damper.
Figure 17B:
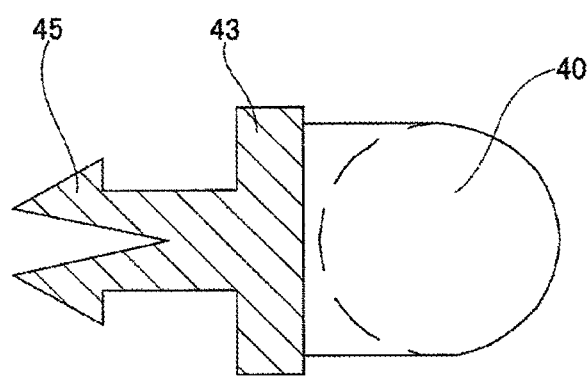
FIG. 17B is a sectional view taken along a line XVII-XVII of FIG. 15, illustrating another example of the distal end of the rod of the telescopic damper.

In order to connect the distal end of the damper rod 40 to the distal end of the protrusion 35, the distal end of the damper rod 40 is formed with a distal end flange 43. The distal end flange 43 is formed with an insertion hole 44 as shown in FIG. 17A or a mushroom-shaped elastic leg 45 as shown in FIG. 17B. When the insertion hole 44 is formed, the connection is made by a connection rod member such as a rivet, a small screw, a nut and the like loosely inserted into the insertion hole 44 and the connection hole 37 so as to allow rotational movement. With the configuration in which the elastic leg 45 is provided, the elastic leg 45 is inserted into the connection hole 37 while elastically reducing an outer diameter of the maximum diameter part thereof. In the inserted state, the rotational movement of the damper rod 40 relative to the distal end flange 43 in the respective directions can be made, based on a gap between an inner periphery of the connection hole 37 and an outer periphery of the elastic leg 45 or elastic deformation of the elastic leg 45.

Figure 18A:
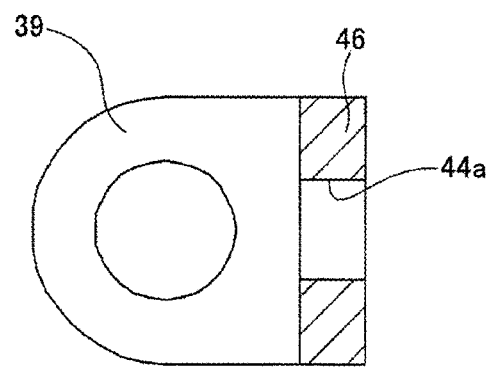
FIG. 18A is a sectional view taken along a line XVIII-XVIII of FIG. 15, illustrating an example of a base end part of a cylinder of the telescopic damper.
Figure 18B:
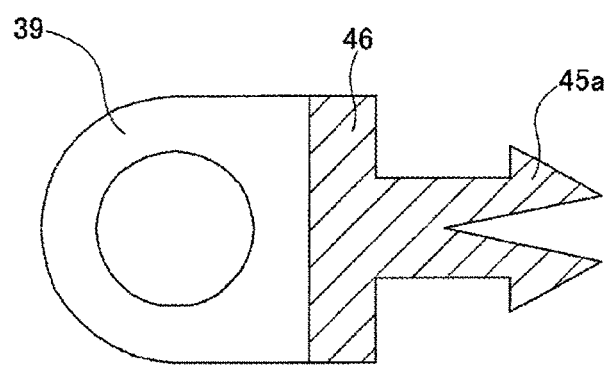
FIG. 18B is a sectional view taken along a line XVIII-XVIII of FIG. 15, illustrating another example of the base end part of the cylinder of the telescopic damper.

A base end part of the cylinder part 39 is formed with a base end-side flange 46, and the base end-side flange 46 is formed with an insertion hole 44a as shown in FIG. 18A or an elastic leg 45a as shown in FIG. 18B. The base end part of the cylinder part is formed to be the same as the distal end of the damper rod 40 and is connected to the connection hole formed at the rear end portion of the extension part 38 so as to allow rotational movement in the respective directions.

The protrusion 35 is axially moved by a telescopic stroke amount (for example, about 1 to 2.5 mm) of a cam device 32 between a state where the position of the steering wheel 1 can be adjusted and an adjusted position. By connecting end portions of the telescopic damper 36 are rotatably to the protrusion 35 and the extension part 38, it is possible to absorb the relative displacement of the protrusion 35 and the extension part 38 resulting from the telescopic stroke.

According to the above tilt-type steering apparatus, when the tilt lever 33 is rotated so as to position the steering wheel 1, the tilt lever 33 can be prevented from being rapidly rotated. That is, as described above, for a case where the cam device is used as an expandable mechanism for maintaining the steering wheel 1 at an adjusted position, when the tilt lever 33 is rotated downward, the tilt lever 33 may be rapidly rotated despite the intention of the driver, if any measures are not made. In contrast, according to the structure of the tilt-type steering apparatus of the related embodiment, as the tilt lever 33 is rotated downward, the entire length of the telescopic damper 36 is shortened. As a result, the resistance against the downward rotation of the tilt lever 33 functions, so that the momentum of the tilt lever 33 to rotate downward can be weakened. As a result, it is possible to prevent the driver operating the tilt lever 33 from feeling uncomfortable.

The materials of the cylinder part 39 of the telescopic damper 36 and the damper rod 40 are not particularly limited. However, when the linear expansion coefficient of a radially inner side material forming the damper rod 40 is greater than the linear expansion coefficient of a radially outer side material forming the cylinder part 39, it is possible to suppress a change in the damper performance of the telescopic damper 36 to be small (most ideally, to be constant), irrespective of a temperature change. The reason is that when the magnitude relation between the linear expansion coefficients of both materials is controlled as described above, a way with which the viscosity change of the grease 41 due to the temperature change changes the damper performance is opposite to a way with which a thickness change of the gap 42 between the inner periphery of the cylinder part 39 and the outer periphery of the damper rod 40 changes the damper performance.

Specifically, at high temperatures at which the viscosity η of the base oil of the grease 41 is lowered, a thermal expansion amount of the damper rod 40 is increased, compared to a thermal expansion amount of the cylinder part 39, so that a thickness h of the gap 42 is decreased. In contrast, at low temperatures at which the viscosity η of the base oil of the grease 41 is increased, a thermal contraction amount of the damper rod 40 is increased, compared to a thermal contraction amount of the cylinder part 39, so that the thickness h of the gap is increased. A viscosity frictional force FN ($\propto$ damper performance) acting between the inner periphery of the cylinder part 39 and the outer periphery of the damper rod 40 is expressed by a following equation when a facing area of the peripheries is denoted with A and a frictional coefficient between the peripheries and the grease 41 is denoted with kF.

$$FN=(\eta \cdot A \cdot kF)/h$$

As can be clearly seen from the above equation, as the viscosity η is increased and as the thickness h is decreased, the viscosity frictional force acting between the peripheries, i.e., the damper performance of the telescopic damper 36 is increased. In contrast, as the viscosity η is decreased and as the thickness h is increased, the damper performance is decreased. By controlling the magnitude relation of the linear expansion coefficients of both materials of the radially outer side material and the radially inner side material, as described above, the viscosity η and the thickness h change the damper performance in opposite ways, in correspondence to the temperature change. That is, by controlling the magnitude relation of the liner expansion coefficients of both materials, as described above, it is possible to suppress a change in the value 'η/h' of the equation to be small. Since the remaining factor "A·kF" is little changed by the temperatures, it is possible to suppress the change in the damper performance due to the temperature change to be small and to suppress a variation of force, which is necessary to operate the tilt lever 33, to be small, irrespective of the temperature change. As a result, it is possible to further reduce a sense of discomfort, which the driver operating the tilt lever 33 feels.

Figure 20:
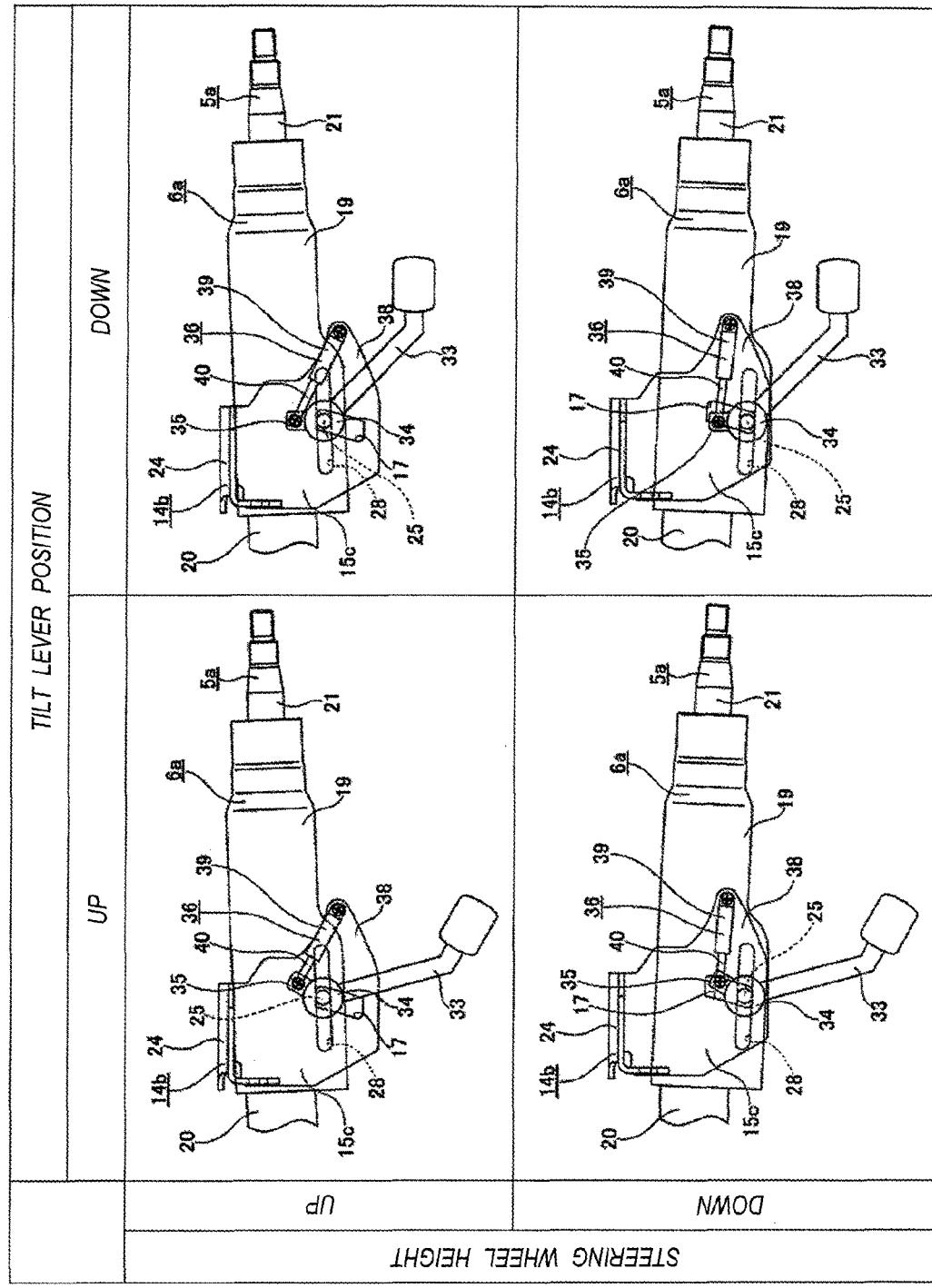
FIG. 20 illustrates a posture change of the telescopic damper in accordance with height position adjustment of the steering wheel.

When rotating the tilt lever 33 so as to position the steering wheel 1 in the structure having the cam device 32, the above-described tilt-type steering apparatus can prevent the tilt lever 33 from being rapidly rotated, so that it is possible to reduce a sense of discomfort, which the driver operating the tilt lever 33 feels. As shown in FIG. 20, an inclined angle of the telescopic damper 36 is changed by the height position of the steering wheel 1 (an inclined angle of the steering column 6a) and is also changed by the posture of the tilt lever 33.

When tilting the steering column 6a, the telescopic damper 36 is extended or shortened and the telescopic damper 36 becomes a resistance. However, by contriving the mounting position of the telescopic damper 36, it is possible to suppress the telescopic amount of the telescopic damper 36 resulting from the tilting movement of the steering column 6a to be small.

FIGS. 1 to 6 illustrate an embodiment of the invention. This embodiment is configured to effectively derive the performance of a telescopic damper 36a and to smoothly adjust the height position of the steering wheel 1 (see FIG. 7) by contriving a mounting position of the telescopic damper 36a. Since the other configurations and operations are the same as the structure of the above-described related embodiment, the descriptions of the equivalent parts are omitted or simplified. In the below, the differences with the related embodiment are intensively described.

In this embodiment, a tilt rod 25a is configured as a bolt having one end portion (a left end portion in FIG. 5) at which a non-circular head part 47 such as hexagonal shape is provided and the other end portion (a right end portion in FIG. 5) at which a screw part 48 is provided. A boss part 34a provided at a base end part of a tilt lever 33a and a driving cam 30a of a cam device 32a are formed as an integral structure. An outer surface of the boss part 34a is formed with an engaging recess portion 49 for fitting therein the head part 47. The tilt rod 25a is inserted into a center hole 50a of the boss part 34a from a male screw part 48-side, a center hole 50b of a driven cam 31a, forming the cam device 32a together with the driving cam 30a, an up-down slot 17 (an example of the tilt slot) formed at the support plate portion 15c, a front-rear slot 28 (an example of the through-hole) formed at a clamped portion 27 and an up-down slot (an example of the tilt slot) formed at the other support plate portion 15b (see FIG. 13), and the male screw part 48 is enabled to protrude from an outer side surface of the other support plate portion 15b. In this state, the head part 47 and the engaging recess portion 49 are engaged, so that the tilt rod 25a and the tilt lever 33a are combined to be synchronously (integrally) rotated. The male screw part 48 is screwed thereon with a nut (an example of the anchor part). A locking means such as a check pin, a caulking and the like is provided between the male screw part 48 and the nut. A thrust bearing such as a sliding washer is provided between an inner surface of the nut and the outer side surface of the other support plate portion 15b. Thereby, a force necessary to relatively rotate the nut and the support plate portion 15c is reduced.

The driven cam 31a is engaged into the up-down slot 17 formed at the support plate portion 15c so that it is movable only along the up-down slot 17. An inner side surface of the driven cam 31a is formed with an engaging convex portion 51 which is elongated in the up-down direction, and the engaging convex portion 51 is engaged with the up-down slot 17. In this state, a driving cam surface 52 provided on the inner side surface of the driving camn 30a and a driven cam surface 53 provided on the outer side surface of the driven cam 311a are engaged. Each of these cam surfaces 52, 53 is formed by connecting convex portions and concave portions, which are alternately arranged in a circumferential direction, via inclined surfaces. As the tilt lever 33a is rotated, a gap between the driven cam 31a (an example of the pressing part) and the nut (an example of the anchor part) is widened or narrowed.

In the tilt-type steering apparatus of this embodiment, the telescopic damper 36a, serving as a resistance in the direction in which its entire length is extended or shortened, is arranged to extend between and connect the driving cam 30a and the driven cam 31a. The basis configuration of the telescopic damper 36a is the same as the telescopic damper 36 (see FIGS. 12 to 15) of the above-described related embodiment, and has the cylinder part 39, the damper rod 40 and the grease 41. The structures shown in FIGS. 16A to 18B can be applied to the telescopic damper 36a. The kinematic viscosity of the base oil of the grease 41 and the relation between the linear expansion coefficient of the radially outer side material forming the cylinder part 39 and the linear expansion coefficient of the radially inner side material forming the damper rod 40 can be also controlled in the same way as the related embodiment.

In order to lay the telescopic damper 36a between the driving cam 30a and the driven cam 31a, a protrusion 35a (an example of the lever-side engaging portion) is integrally provided on an outer periphery of the driving cam 30a and a distal end of the protrusion 35a is formed with a connection hole 37a. A support arm 54 (an example of the cam-side engaging part) is integrally provided on the driven cam 31a and a distal end of the support arm 54 is provided with a second connection hole 55. A distal half portion of the support arm 54 is offset towards the driving cam 30a from a base half portion thereof. The reason is to properly make a position relation of both-end support parts of the telescopic damper 36a relative to the axial direction (the left-right direction in FIG. 3) of the tilt rod 25a.

The telescopic damper 36a rotatably connects a distal end flange 43a provided at the distal end of the damper rod 40 into the connection hole 37a formed at the distal end of the protrusion 35a and a base end-side flange 46a provided at the base end part of the cylinder part 39 into the second connection hole 55 formed at the distal end of the support arm 54 by connection screws 56a, 56b, respectively. The connection structure may be similar to the structure shown in FIGS. 17B and 18B. In any case, the flanges 43a, 46a are connected into the connection holes 37a, 55 such that a rotational movement about the connection holes 37a, 55 and a slight (to the extent that a change in an axial size of the cam device 32a can be absorbed) rotational movement in the axial direction of the tilt rod 25a are possible. In this way, in a state in which the telescopic damper 36a is arranged to extend between and connect the distal end of the protrusion 35a and the distal end of the support arm 54, the cylinder part 39 forming the telescopic damper 36a is arranged at a lower side of the damper rod 40 with the opening thereof faced upwards.

In the tilt-type steering apparatus of this embodiment configured as described above, as shown in FIG. 6, the telescopic damper 36a is extended or shortened only when the tilt lever 33a is rotated. That is, when tilting the steering column 6a so as to adjust the height position of the steering wheel 1, the telescopic damper 36a is not extended or shortened. Therefore, the telescopic damper 36 does not serve as a resistance against the height position adjustment of the steering wheel 1, so that it is possible to adjust the height position more smoothly.

Figure 1:
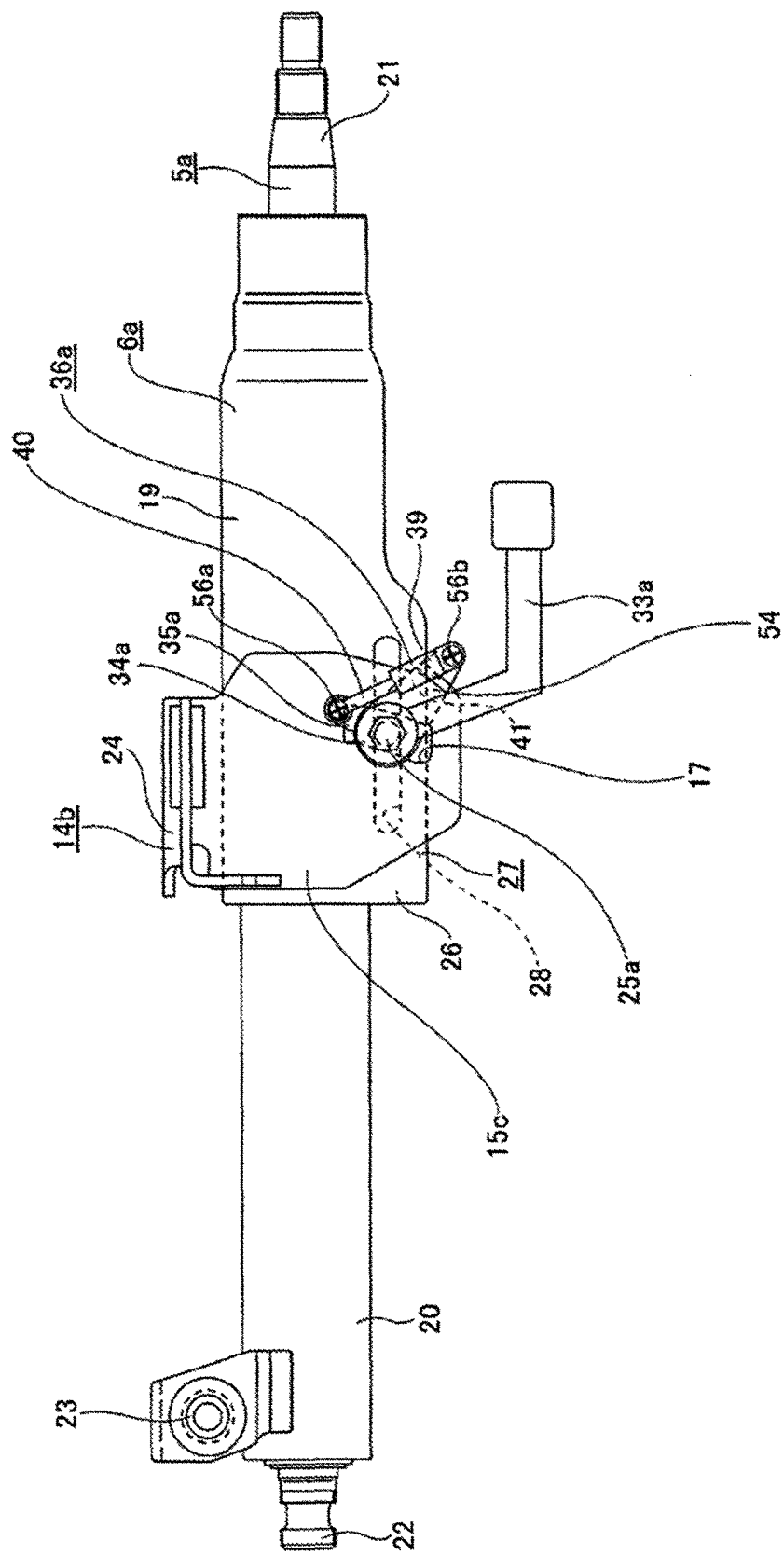
FIG. 1 is a side view of a tilt-type steering apparatus according to an embodiment of the invention.
Figure 2:
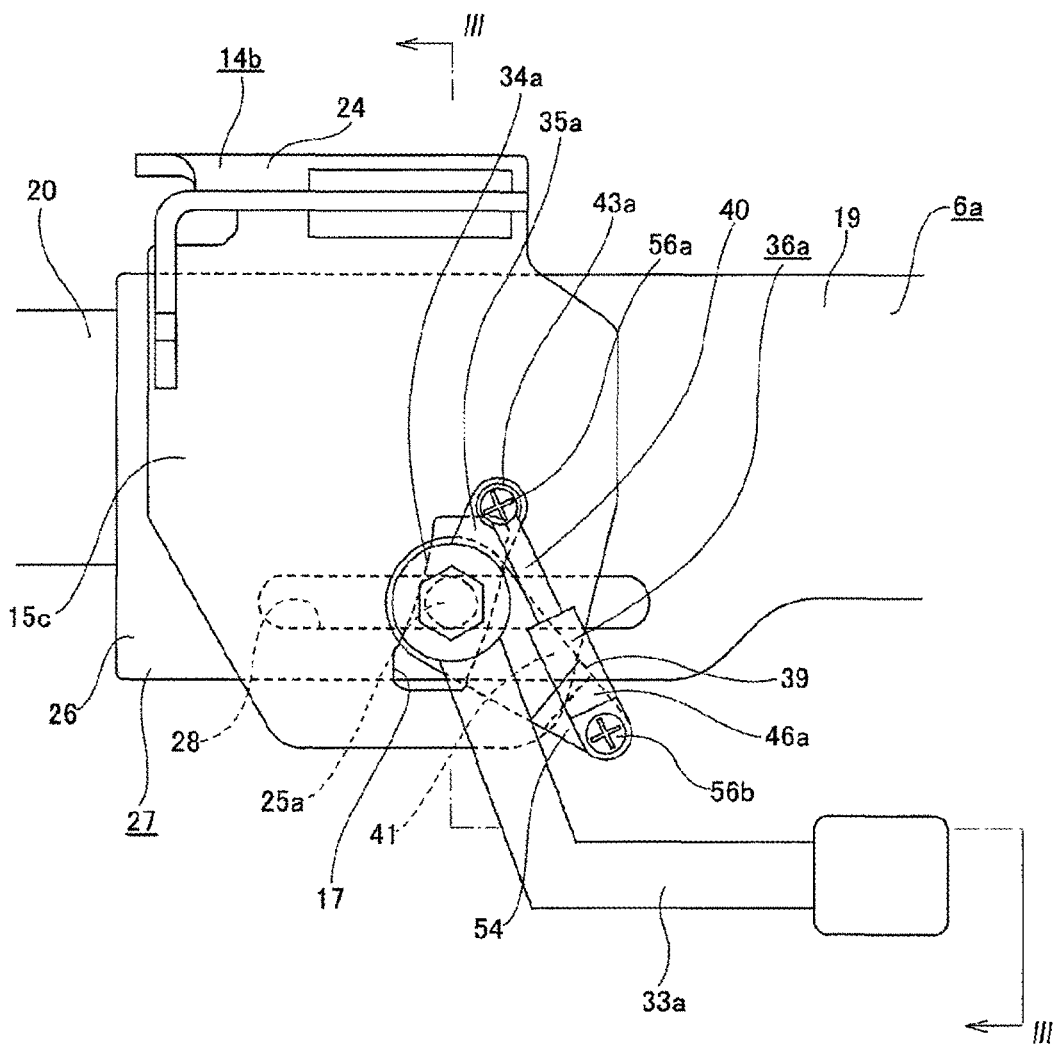
FIG. 2 is an enlarged view of a central part of FIG. 1.
Figure 3:
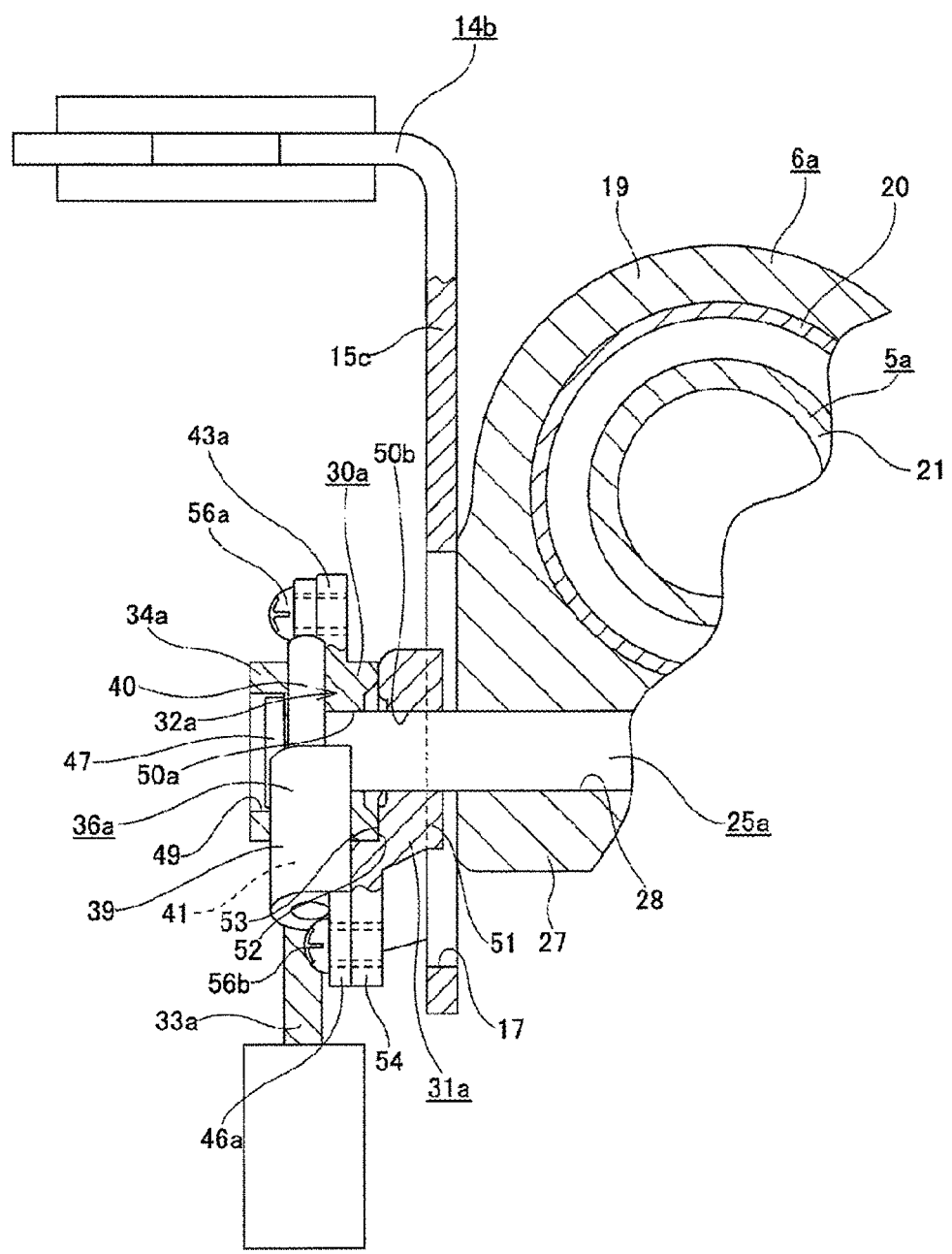
FIG. 3 is a partial sectional view taken along a line III-III of FIG. 2.
Figure 4:
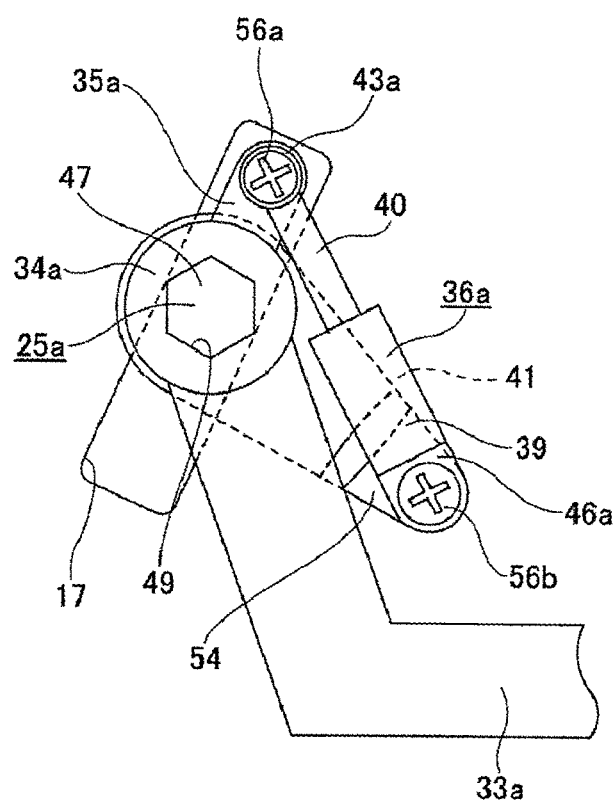
FIG. 4 is a side view of the central part of FIG. 1.
Figure 5:
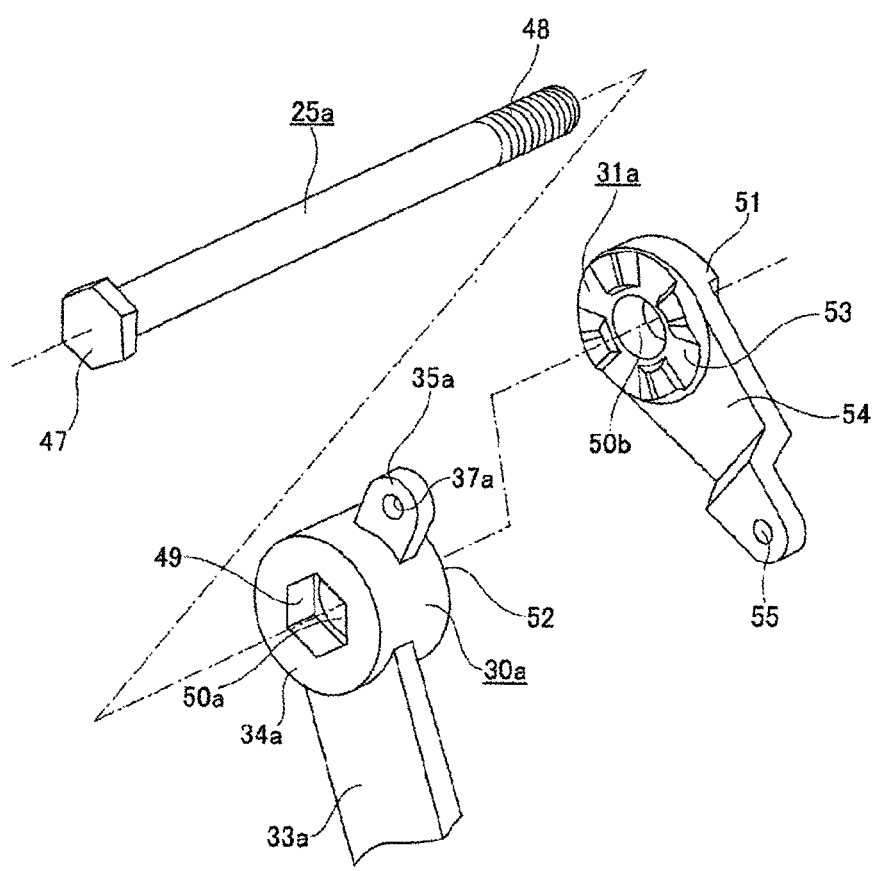
FIG. 5 is an exploded perspective view of a part shown in FIG. 4.
Figure 6:
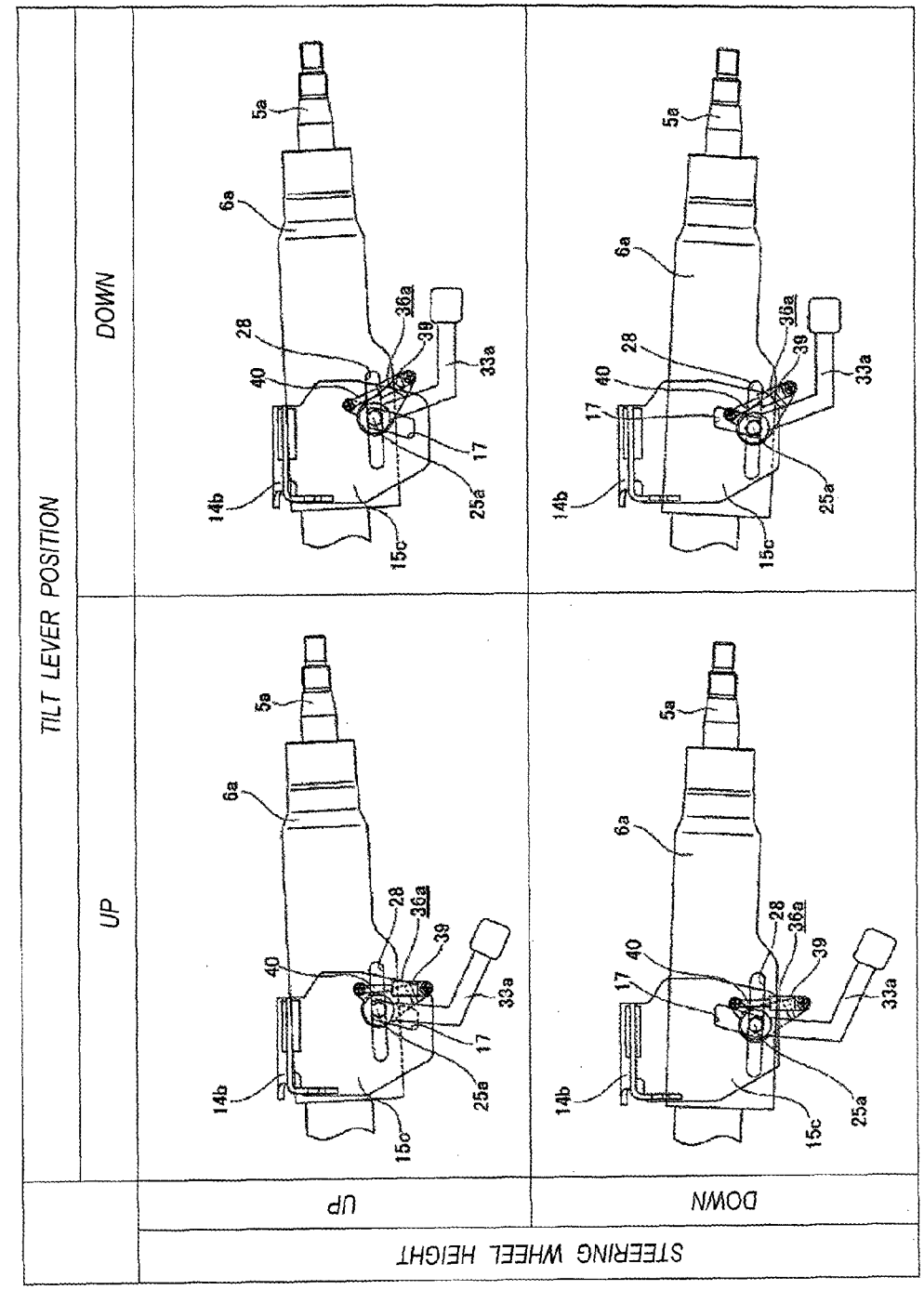
FIG. 6 illustrates a posture change of a telescopic damper in accordance with height position adjustment of a steering wheel.
Figure 7:
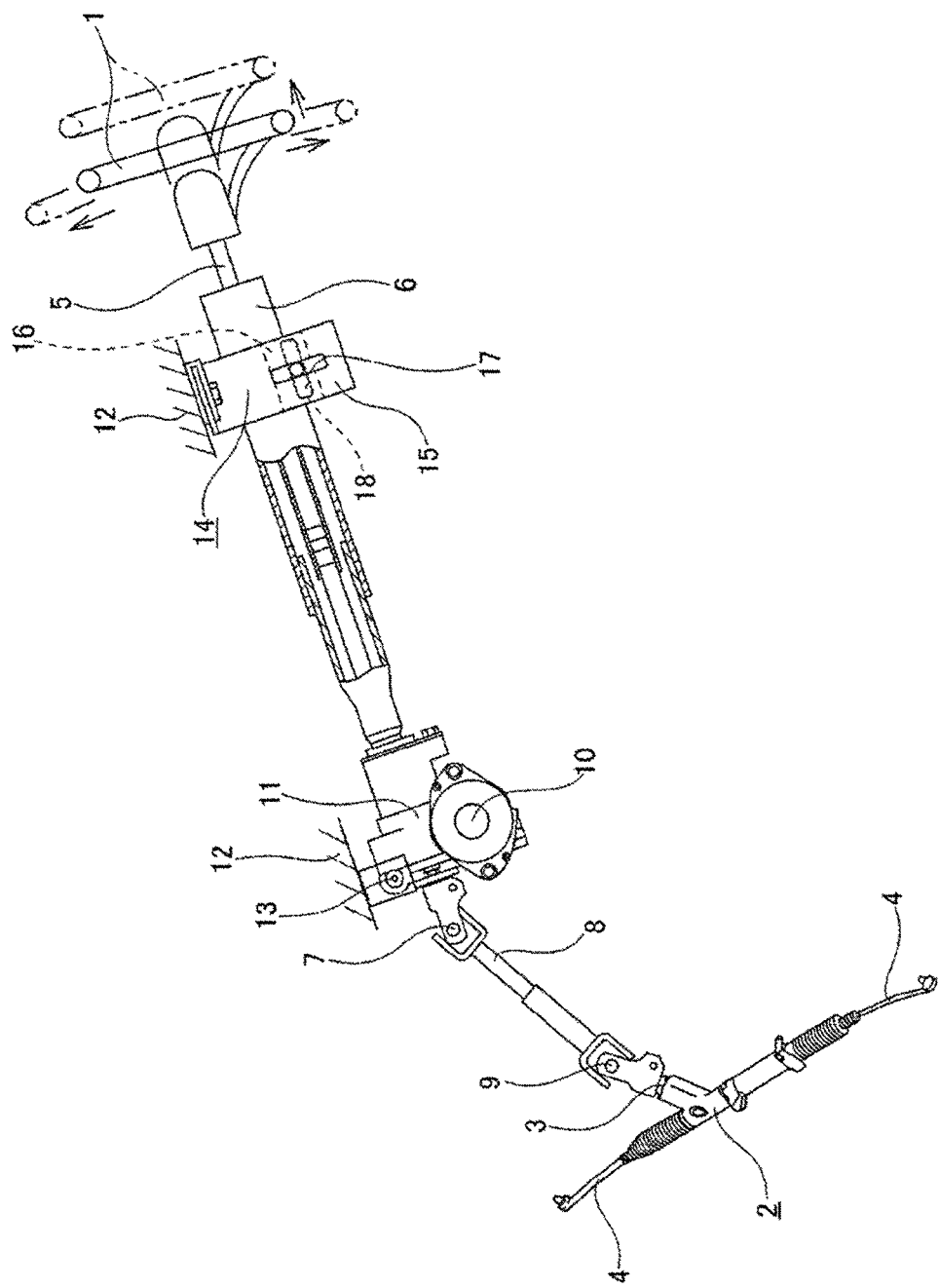
FIG. 7 is a side view of a vehicle steering apparatus according to a first conventional example.
Figure 8:
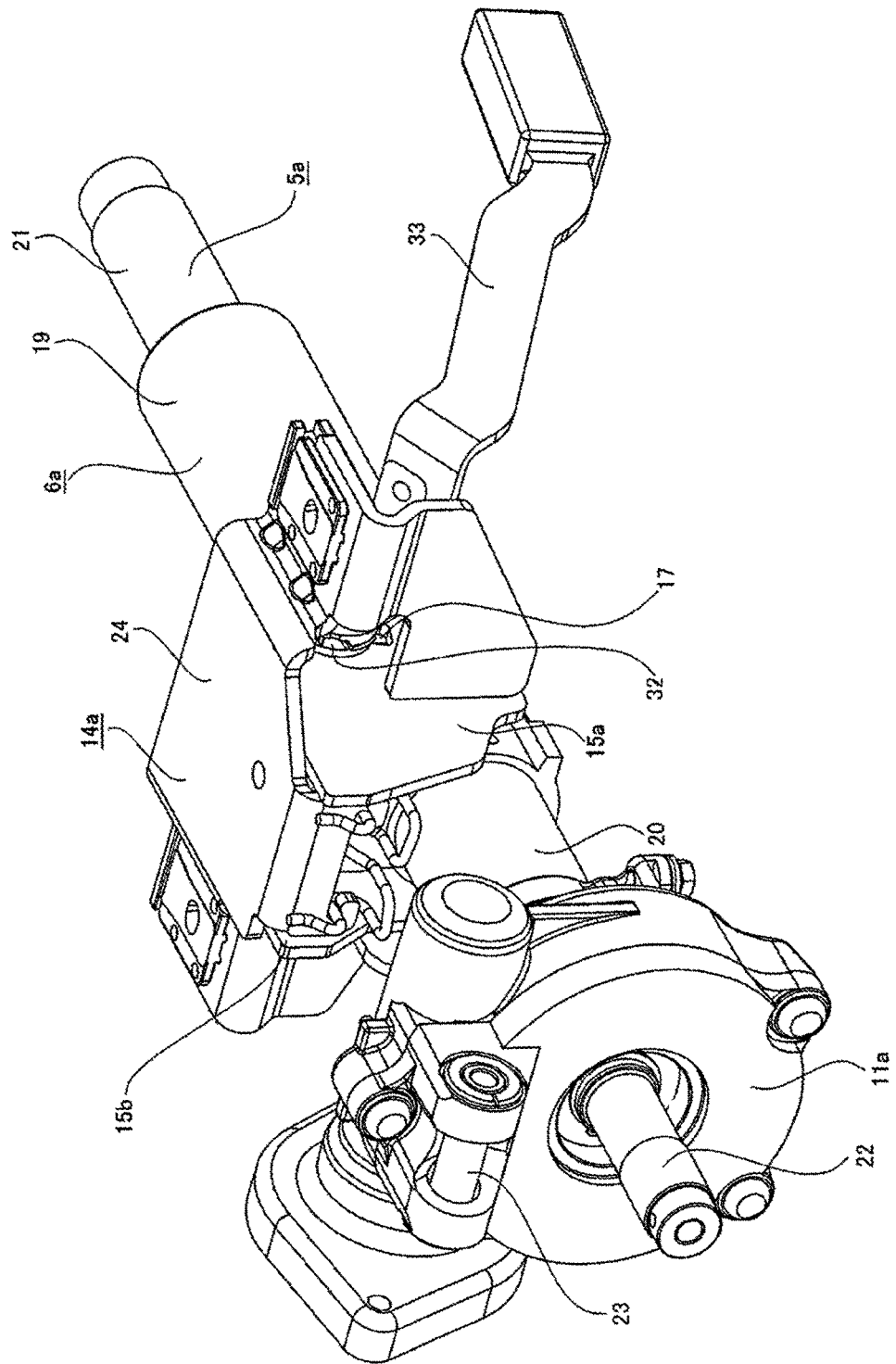
FIG. 8 is a perspective view of a vehicle steering apparatus according to a second conventional example, viewed from the front and from above.
Figure 9:
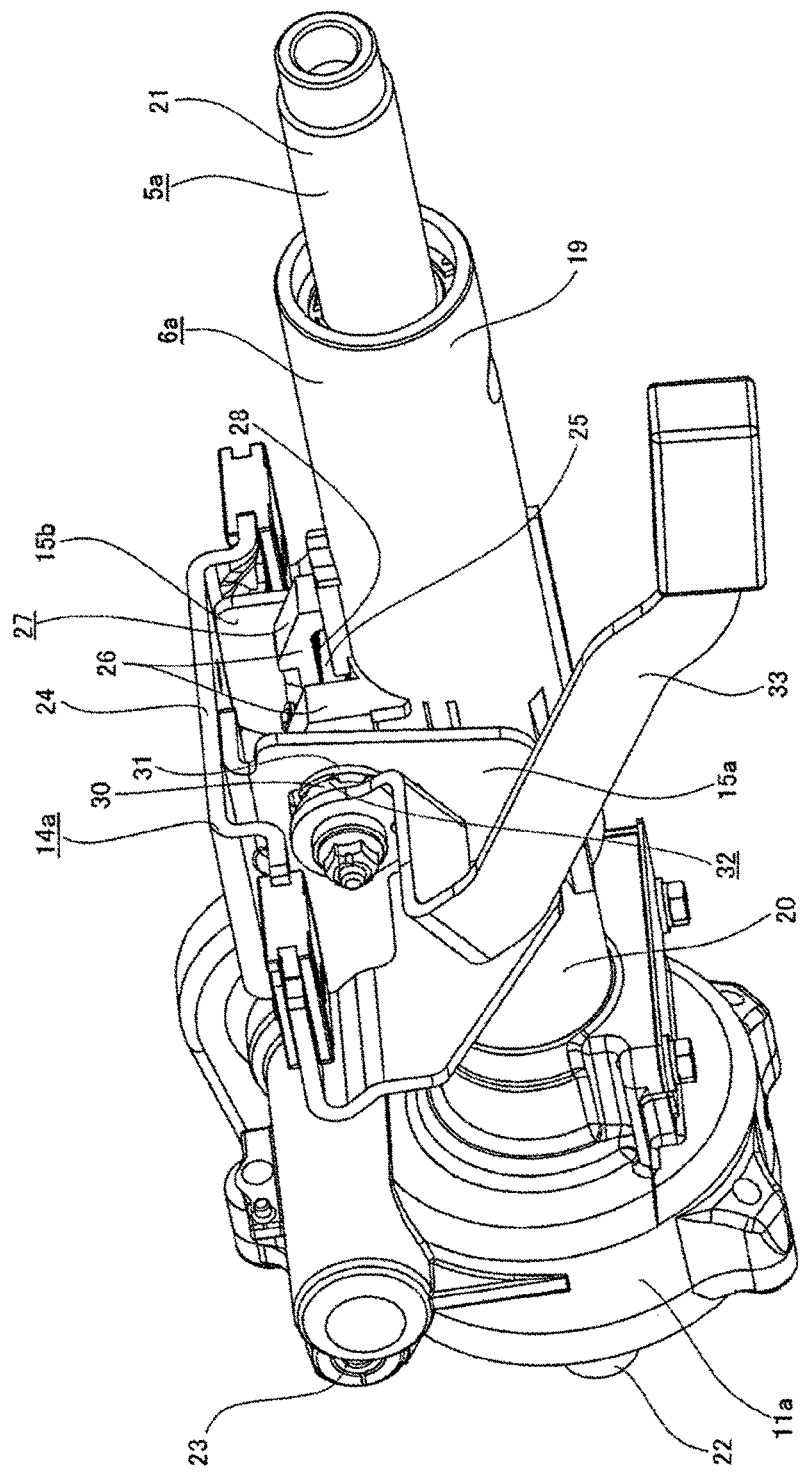
FIG. 9 is a perspective view of the vehicle steering apparatus of FIG. 8, viewed from the back and from below.
Figure 10:
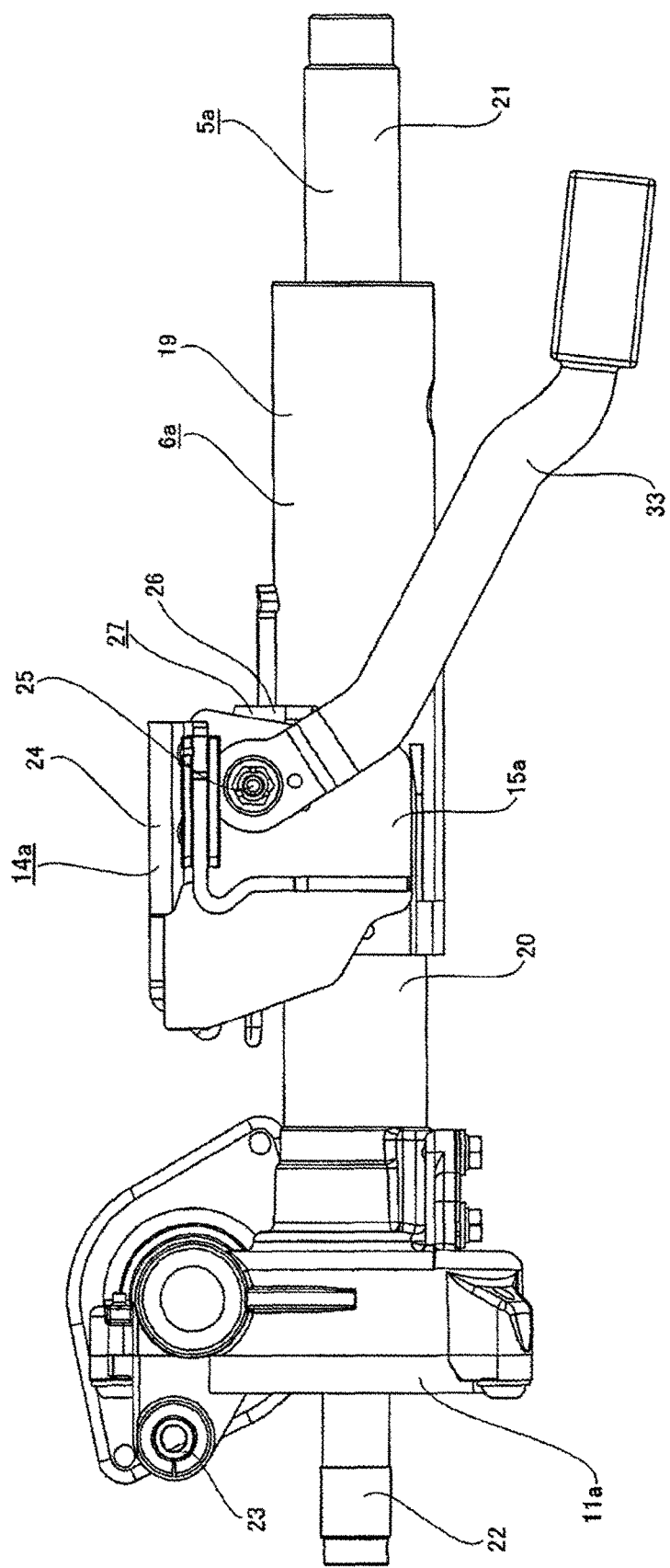
FIG. 10 is a side view of the vehicle steering apparatus of FIG. 8.
Figure 11:
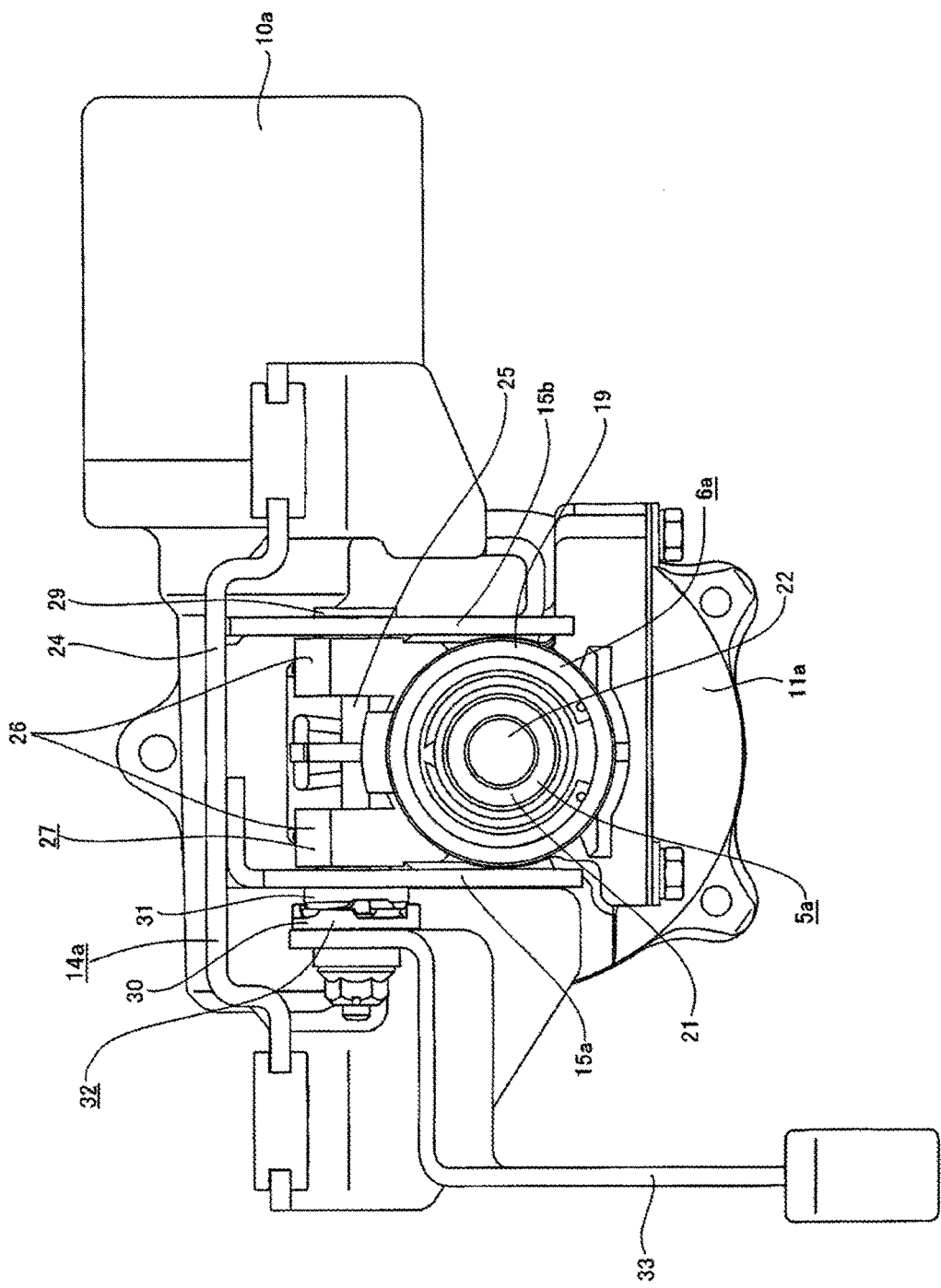
FIG. 11 is a rear view of the vehicle steering apparatus, viewed from the right in FIG. 10.
Figure 12:
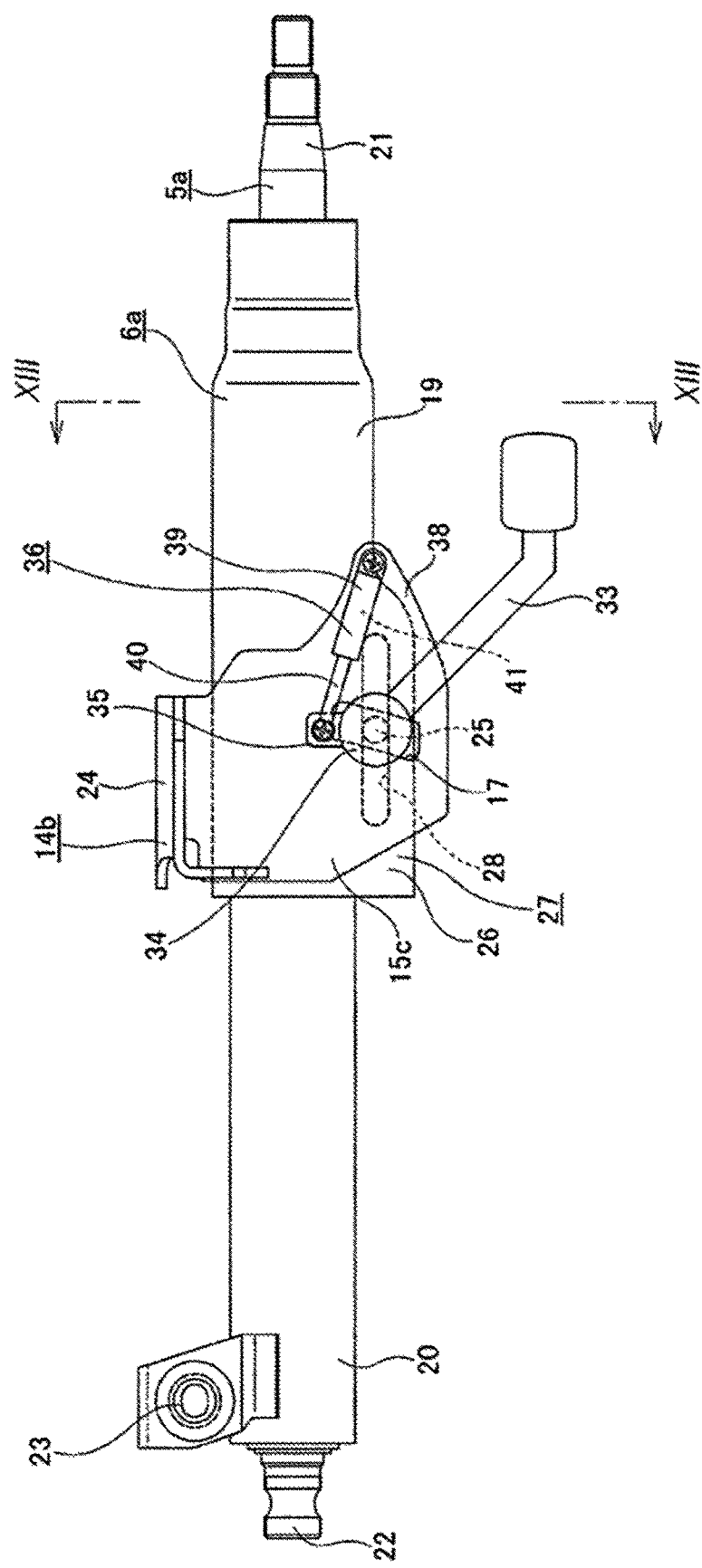
FIG. 12 is a side view of a tilt-type steering apparatus according to a related embodiment of the invention.
Figure 13:
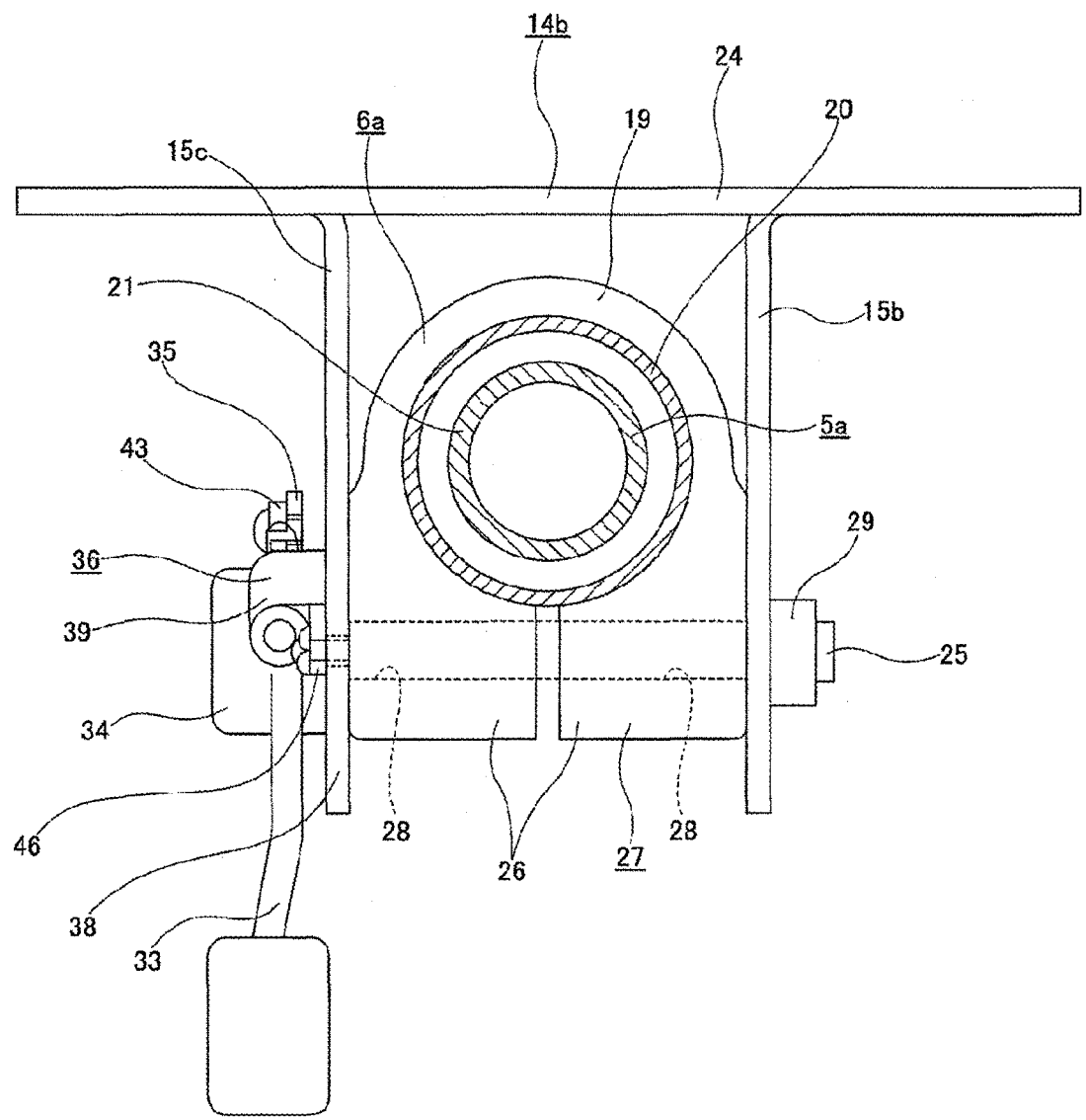
FIG. 13 is an enlarged sectional view taken along a line XIII-XIII of FIG. 12.
Figure 14:
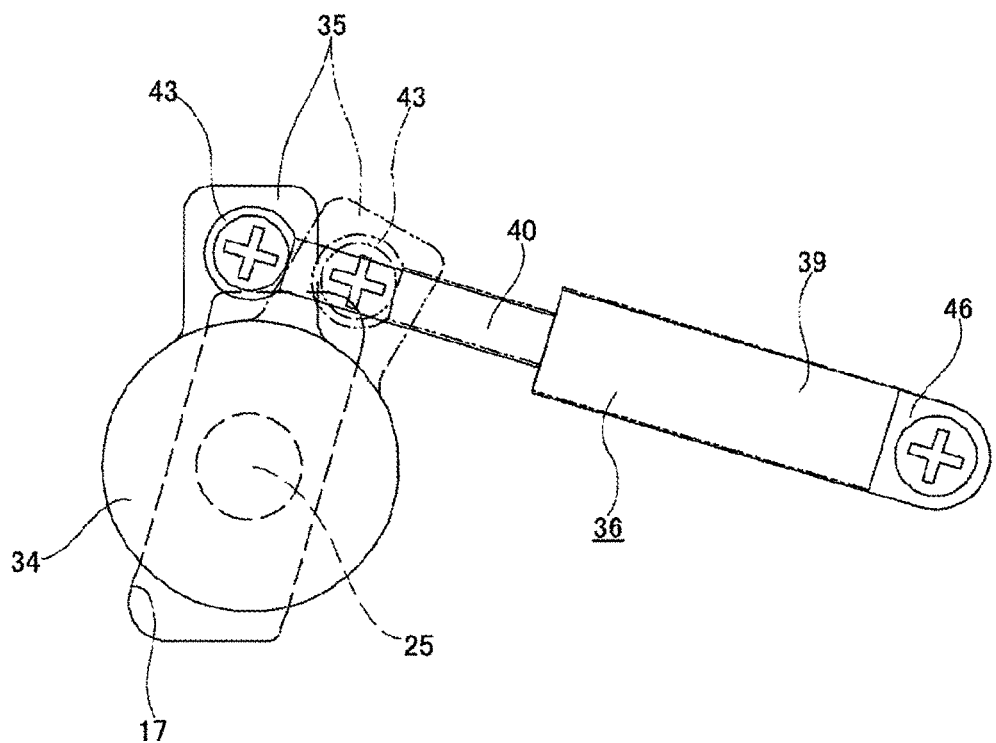
FIG. 14 is a side view of a part at which a telescopic damper is mounted, viewed in the same direction as FIG. 12.
Figure 15:
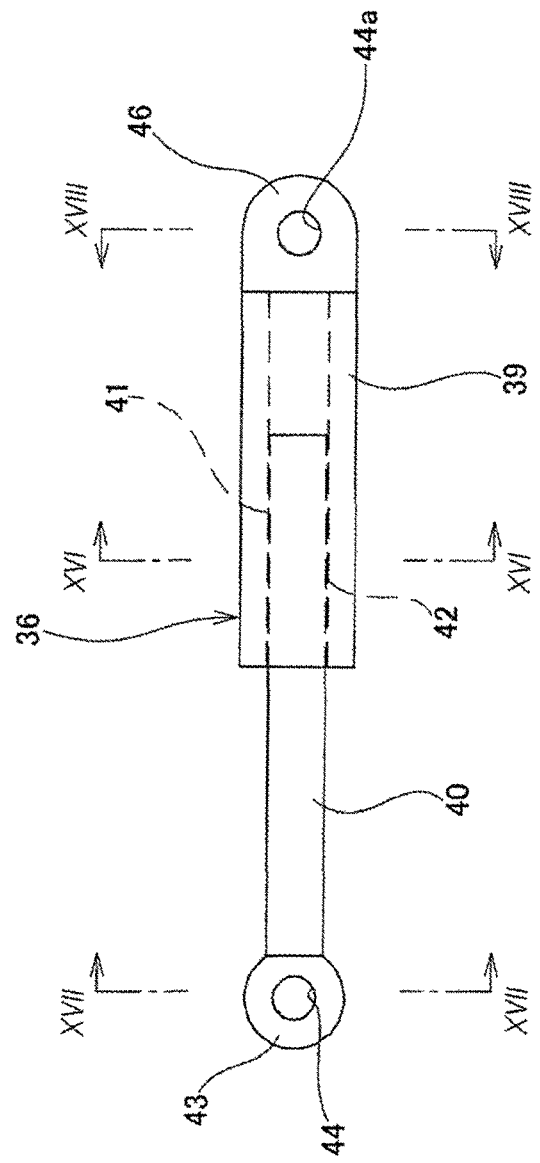
FIG. 15 is a side view of the telescopic damper.

Also, in this embodiment, as shown in FIG. 6, the hollow cylinder part 39 having the distal end portion with the opening is arranged at the lower side and the cylinder part 39 is made not to be largely inclined, irrespective of the posture of the steering column 6a or tilt lever 33a, so that the opening of the cylinder part 39 is faced upwards. Hence, the grease 41 interposed between the inner periphery of the cylinder part 39 and the outer periphery of the damper rod 40 is difficult to leak out. Therefore, it is possible to keep a sufficient amount of the grease 41 between the peripheries for a long time, so that it is possible to keep the effect of preventing the driver operating the tilt lever 33a from feeling unpleasant for a long time.

INDUSTRIAL APPLICABILITY

The invention can be implemented as a tilt-telescopic-type steering apparatus configured to adjust a height position and a front-rear position of a steering wheel and can be also implemented as a tilt-type steering apparatus configured to adjust only the height position of the steering wheel.

The application is based on a Japanese Patent Application No. 2012-242385 filed on Nov. 2, 2012, the content of which is incorporated herein by reference.

DESCRIPTION OF REFERENCE NUMERALS AND SIGNS

1: Steering Wheel
5, 5a: Steering Shaft
6, 6a: Steering Column
12: Vehicle Body
14, 14a, 14b: Support Bracket
15, 15a, 15b, 15c: Support Plate Portion
17: Up-Down Slot (Tilt Slot)
19: Outer Column
20: Inner Column
21: Outer Shaft
22: Inner Shaft
25, 25a: Tilt Rod
27: Clamped Portion
28: Front-Rear Slot (Through-Hole)
30, 30a: Driving Cam
31, 31a: Driven Cam
32, 32a: Cam Device
33, 33a: Tilt Lever
35, 35a: Protrusion (Lever-Side Engaging Portion)
36, 36a: Telescopic Damper
39: Cylinder Part
40: Damper Rod
41: Grease
50a, 50b: Center Hole
52: Driving Cam Surface
53: Driven Cam Surface
54: Support Arm (Cam-Side Support Portion)

The invention claimed is:

1. A tilt steering apparatus comprising:
a cylindrical steering column;
a clamped portion provided at a portion of the steering column in a fixed manner and having a through-hole in a width direction;
a steering shaft supported radially inside the steering column in a rotatable manner, the steering shaft having a rear end portion configured to protrude rearwards from a rear end opening of the steering column such that a steering wheel is fixed thereto;
a support bracket configured to be supported by a fixing part of a vehicle body and including a pair of support plate portions to clamp the clamped portion from both sides in the width direction, the support plate portions being formed with a pair of tilt slots elongated in an up-down direction at locations on the support plate portions that are aligned with each other;
a tilt rod inserted into the tilt slots and the through-hole in the width direction;
an anchor part provided at one end portion of the tilt rod protruding from an outer side surface of one of the support plate portions;
a pressing part provided at the other end portion of the tilt rod protruding from an outer side surface of the other support plate portion;
an expandable mechanism configured to widen or to narrow a gap between the pressing part and the anchor part;
a tilt lever operable to widen or to narrow the gap by rotating about the tilt rod, and
a telescopic damper serving as a resistance in a direction in which an entire length of the telescopic damper is extended or shortened, the telescopic damper being arranged to apply the resistance against a rotation of the tilt lever in a direction allowing a position of the steering wheel to be adjusted,
wherein the expandable mechanism comprises a cam device including a driven cam and a driving cam,
wherein an outer side surface of the driven cam has a driven cam surface formed by connecting a convex portion and a concave portion via an inclined surface, and the driven cam is engaged with the tilt slot of the other support plate portion so as to be movable only along the tilt slot, in a state in which the tilt rod is rotatably inserted into a center hole of the driven cam,
wherein an inner side surface of the driving cam has a driving cam surface facing the driven cam surface and formed by connecting a convex portion and a concave portion via an inclined surface, and the driving cam is configured to be rotated by the tilt lever around a center axis of the tilt rod,
wherein the expandable mechanism is configured such that an axial size of the cam device is expanded or reduced in accordance with an engagement of the driven cam surface and the driving cam surface, and
wherein the telescopic damper is arranged to extend between and connect a lever-side engaging portion which rotates together with the tilt lever around the center axis of the tilt rod and a cam-side engaging part provided on the driven cam, and a distance between the lever-side engaging portion and the cam-side engaging part changes in accordance with the rotation of the tilt lever.

2. The tilt steering apparatus according to claim 1, wherein the telescopic damper comprises a hollow cylinder part having an distal end portion with an opening, a damper rod having a distal end portion loosely inserted into the cylinder part from the distal end of the cylinder part, and a grease interposed between an inner periphery of the cylinder part and an outer periphery of the damper rod, and
wherein the telescopic damper is disposed with the cylinder part being arranged at a lower side.

3. The tilt steering apparatus according to claim 2, wherein each of the inner periphery of the cylinder part and the outer periphery of the damper rod is configured as a corrugated surface having a series of grooves and projections arranged alternately in a circumferential direction.

4. The tilt steering apparatus according to claim 2, wherein a kinematic viscosity of a base oil of the grease is 500 to 50000 $mm^2/s$ at 40° C.

5. The tilt steering apparatus according to claim 2, wherein a linear expansion coefficient of a radially inner side material forming the damper rod is greater than a linear expansion coefficient of a radially outer side material forming the cylinder part.

6. The tilt steering apparatus according to claim 5, wherein the radially outer side material is an iron-based alloy and the radially inner side material is a lightweight alloy or a synthetic resin.

7. The tilt steering apparatus according to claim 5, wherein the radially outer side material is a metal and the radially inner side material is a synthetic resin.

8. The tilt steering apparatus according to claim 1, wherein the steering column is configured as a telescopic steering column comprising an outer column and an inner column, the outer column and the inner column being telescopically combined,
- wherein the steering shaft is configured as a telescopic steering shaft comprising an outer shaft and an inner shaft, the outer shaft and the inner shaft being telescopically combined in a torque transmittable manner,
- wherein the clamped portion is provided on the outer column and the through-hole is formed as a front-rear slot elongated in an axial direction of the outer column, and
- wherein the tilt rod is arranged such that, in addition to a height position of the steering wheel, a front-rear position of the steering wheel is adjustable within a range in which the tilt rod is movable inside the front-rear slot.

* * * * *